The present invention relates to the windshield wiper art and more particularly to an improved construction for mounting a windshield wiper arm on its associated drive shaft.

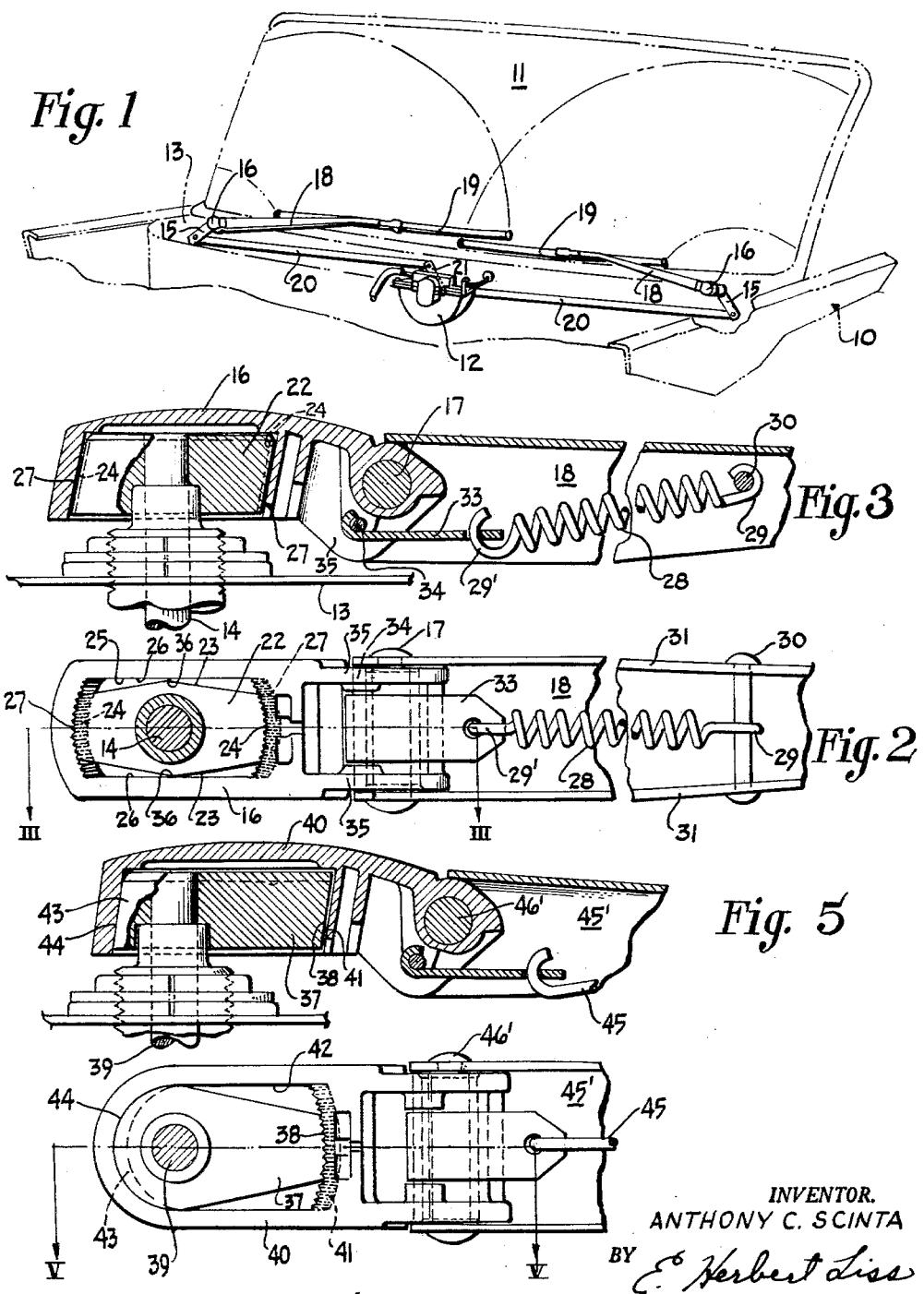

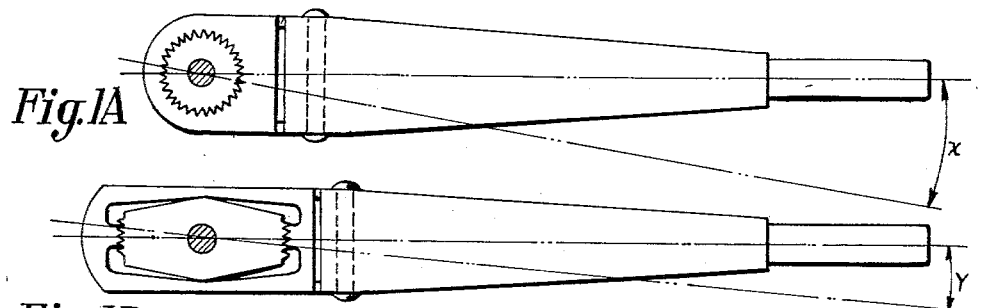
Fig. 1A
Fig. 1B
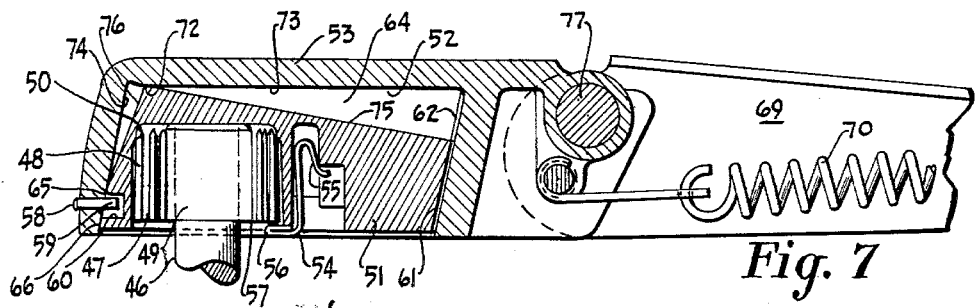
Fig. 7
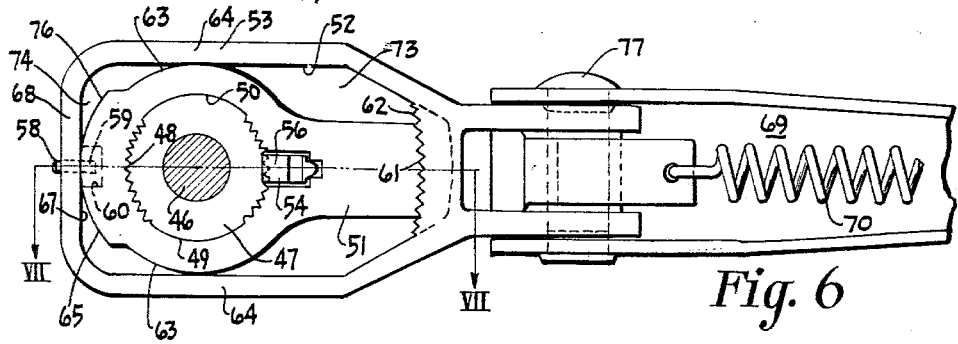
Fig. 6
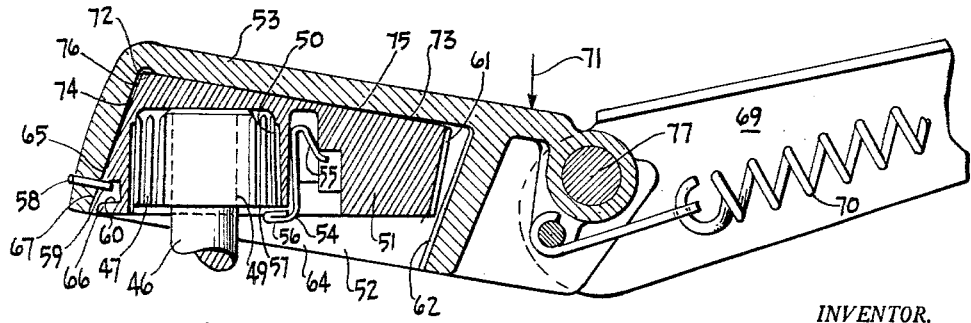
Fig. 8
INVENTOR.
ANTHONY C. SCINTA
BY E. Herbert Liss
ATTORNEY 3,161,902
WIPER ARM
Anthony C. Scinta, Hamburg, N.Y., assignor to Trico
Products Corporation, Buffalo, N.Y.
Filed Oct. 10, 1962, Ser. No. 229,623
10 Claims. (Cl. 15—250.34)

In the past, there have been various ways of mounting a windshield wiper arm on its associated drive shaft. One of these ways consisted of providing an internally fluted or serrated bore in the wiper arm mounting head which was mounted on a serrated drive burr attached to the outer end of the drive shaft so that the serrations of the bore and the serrations of the burr were in interlocking engagement. Both the burr and the bore of the foregoing construction were of circular configuration. Because of the torsional forces exerted on the mating burr and bore during wiper operation, design considerations dictated that the linear spacing between adjacent serrations on the burr and bore could not be closer than a certain minimum distance. Thus, a wiper arm mounted in the foregoing manner could be circumferentially adjusted only to the above-mentioned certain distance at the burr. However, such an adjustment at the burr oftentimes resulted in a displacement of as much as 1½" to 2" at the outer end of the wiper carried by the wiper arm. The above type of connection, however, was extremely desirable because of the ease in which a wiper arm could be mounted on its associated drive shaft and because of the positive locking action which it provided. It is with the retaining of the advantages of the foregoing construction while permitting smaller increments of adjustability of a wiper arm that the present invention is concerned.

It is accordingly the primary object of the present invention to provide a wiper arm mounting construction which utilizes a serrated drive burr on the end of a drive shaft to mount a windshield wiper arm having an internally serrated bore, and which also permits relatively small increments of adjustment of the wiper arm on its drive shaft.

Another object of the present invention is to provide a wiper arm mounting construction utilizing a serrated drive burr and a serrated bore which permits a wiper arm to be adjusted without removal of the wiper arm from the burr, thereby permitting the adjustment of the wiper arm to be made in an accurate manner because there is no physical separation of the arm from its associated burr during the adjustment. Other objects and attendant advantages of the present invention will readily be perceived hereafter.

In accordance with a first embodiment of the present invention, an enlongated drive burr of greater length than width is provided at the end of the drive shaft. An elongated aperture for receiving said elongated drive burr is provided within the mounting head of the wiper arm. The elongated aperture in the mounting head is larger than the drive burr and therefore permits selective angular adjustment of the mounting head relative to the elongated drive burr. At least one relatively short end of the elongated drive burr has serrations formed thereon. A mating internal relatively short surface of the elongated aperture of the mounting head is also provided with a serrated surface which is adapted to interlockingly engage the serrated portion of the elongated drive burr. Because an elongated drive burr is used, the serrations on the elongated drive burr of the present invention can be located at a greater distance from the drive shaft axis than the serrations on the circular drive burr which was used in the past, and because the serrations are spaced the same minimum distance apart as they were on the circular drive burr, the movement of the wiper arm relative to the drive burr a circumferential distance of one serration will result in a correspondingly smaller movement at the outer end of the wiper arm than the distance previously experienced with the use of a circular drive burr.

The wiper arm possesses a biasing spring which biases the wiper carrying portion thereof toward an associated windshield. In the present invention, the mounting head and drive burr are of such a configuration that the reactive force produced by a wiper pressing on a windshield is transmitted to the mounting head by the action of this spring to thereby securely lock the mounting head on the burr in an adjusted position. In accordance with one embodiment of the present invention, the drive burr forms a part of the wiper arm, rather than forming a part of the drive shaft. In this embodiment, the mounting head may be pressed toward an associated windshield against the bias of the foregoing spring to thereby release the mounting head from the serrations on the drive burr and thereafter permit the mounting head to be rotated circumferentially relative to said drive burr, without removing the mounting head from the drive burr. After the mounting head has been moved to its adjusted position, it is released and the spring will cause the mounting head to return to a position wherein the serrations are in engagement, to thereby securely lock the wiper arm in its adjusted position. Because there is no necessity to remove the wiper arm mounting head from the drive shaft to effect the foregoing adjustment, the latter may be made easily and accurately. The present invention will be more fully understood when the following portions of the specification are read in conjunction with the accompanying drawings wherein:

FIG. 1 is a fragmentary perspective view of an automotive vehicle mounting a windshield wiper arm of the present invention;

FIG. 1A is a schematic view showing the amount of linear movement at the outer end of a wiper arm corresponding to the movement of the mounting head a distance of one serration on a circular drive burr;

FIG. 1B is a schematic view showing the amount of linear movement at the end of a wiper arm corresponding to the movement of the mounting head a distance of one serration on an elongated drive burr;

FIG. 2 is a bottom plan view of one form of a windshield wiper arm mounting construction in accordance with the principles of the present invention;

FIG. 3 is a cross sectional view taken along line III—III of FIG. 2;

FIG. 4 is a bottom plan view of another form of a windshield wiper arm mounting construction of the present invention;

FIG. 5 is a cross sectional view taken along line V—V of FIG. 4;

FIG. 6 is a bottom plan view of another form of the wiper arm mounting construction of the present invention;

FIG. 7 is a cross sectional view taken along line VII—VII of FIG. 6; and

FIG. 8 is a view of the embodiments of FIGS. 6 and 7 showing how the wiper arm mounting head may be disengaged from the drive burr for purposes of adjustment, without removing the mounting head from the drive burr.

In FIG. 1 an automotive vehicle 10 is shown having a curved windshield 11 mounted thereon in the conventional manner. A windshield wiper motor 12 is secured to the firewall of the vehicle underneath the cowl 13 thereof.

Rotatably journaled in the cowl 13 of the vehicle are a pair of drive shafts 14, each of which has one end of a crank arm 15 secured to one end thereof and a wiper arm mounting head 16 removably secured to the other end thereof. Pivotally secured to mounting heads 16 by pins 17 are wiper carrying portions 18 which mount wipers 19. The ends of crank arms 15, which are remote from drive shafts 14 are pivotally coupled to outer ends of elongated links 20, the inner ends of which are pivotally mounted on drive lever 21 which is secured to the wiper motor drive shaft (not shown). As is well understood in the art, whenever wiper motor 12 is in operation, wipers 19 will be oscillated back and forth across the windshield because of the linkage, described above, which is located between said wiper motor and said wipers.

In accordance with one embodiment of the present invention, each drive shaft 14 carries an elongated drive burr 22 fixedly mounted on the outer end thereof remote from crank arm 15. The elongated drive burr 22 (FIGS. 2 and 3) includes relatively long sides 23, and relatively short sides having serrations 24 thereon. Elongated drive burr 22 is of smaller outer dimension than elongated aperture 25 formed within mounting head 16. Elongated aperture 25 includes relatively long side walls 26, and relatively short side walls having serrations 27 thereon. Serrations 24 are adapted to be placed in interlocking engagement with serrations 27. It can readily be seen that the longitudinal axis of elongated aperture 25 can be oriented in various positions relative to the longitudinal axis of elongated drive burr 22 to thereby adjust the angular position of mounting head 16 on drive burr 22. In order to effect the foregoing adjustment, it is merely necessary to pull mounting head 16 outwardly away from shaft 14 to thereby disengage serrations 24 and 27 and thereafter place mounting head 16 in a different position on drive burr 22 by sliding mounting head 16 back onto drive burr 22 in a desired position.

Because elongated drive burr 22 is utilized with serrations on the shorter sides thereof, said serrations are located at a further distance from the axis of shaft 14 than if a circular drive burr were used. As noted above, since design considerations dictate that the serrations be no less than a certain minimum distance apart, the fact that the serrations 24 are at a greater distance from the axis of shaft 14 than on circular drive burrs causes the actual adjustment at the outer end of a wiper arm to be less for each adjustment through a distance of one serration at the drive burr than with circular drive burrs. The foregoing can be more readily visualized from FIGS. 1A and 1B wherein serrations of a given spacing provide a movement of the amount $x$ at the outer end of a wiper arm mounted on a circular drive burr when the mounting head is shifted a distance of one serration relative to the drive burr, as can be seen from FIG. 1A, whereas a movement of a smaller distance $y$ is obtained when the serrations are located on the short side of an elongated drive burr and the mounting head is shifted a distance of one serration, as shown in FIG. 1B.

From FIG. 3 it will be noted that serrations 24 and 27 are inclined to the axis of drive shaft 14. This arrangement requires that mounting head 16 be slid onto serrations 24 of drive burr 22 in the direction of inclination of the serrations. The purpose of the foregoing orientation of the serrations is to cause mounting head 16 to be held in position on drive burr 22 without the use of other types of attaching means. More specifically, in order to bias wipers 19 toward an associated windshield, a spring 28 is provided, one end 29 thereof being hooked around pin 30, which extends between opposite sides 31 of wiper carrying portion 18, and the other end 29' thereof being hooked into one end of strap 33, the other end of which is hooked around pin 34 extending between opposite sides 35 of mounting head 16. When wiper 19 is biased toward the windshield by spring 28, a counterclockwise reactive force is exerted on mounting head 16 in FIG. 3 by the action of wiper carrying portion 18 exerting an upward force on pin 17. However, since serrations 24 and 27 are inclined relative to the axis of shaft 14, in the manner shown in FIG. 3, the upward force on pin 17 provides a wedging action between serrations 24 and 27 to prevent mounting head 16 from being detached from drive burr 22. In other words, the action of spring 28 on the inclined serrations of mounting head 16 and wiper carrying portion 18 effects a locking engagement between the drive burr and the mounting head.

Whenever it is desired to remove mounting head 16 from drive burr 22, wiper carrying portion 18 of the wiper arm is pivoted in a counterclockwise direction about pin 17 and after wiper 19 is thus removed from the windshield 11 so that the reactive force produced thereby no longer causes the mounting head 16 to exert a wedging action on drive burr 22, mounting head 16 is slid off of drive burr 22 in the direction of serrations 24, as described above.

Relatively long sides 23 of elongated drive burr 22 have apices 36 formed thereon and the latter bear on relatively long sides 26 of elongated aperture 25 when the longitudinal axes of the elongated drive burr and the elongated aperture coincide. The foregoing bearing action provides additional support for mounting head 16 when the parts are in the foregoing orientation. If desired, apices 36 may be formed as a radius about the axis of shaft 14, as described hereafter relative to FIG. 6, to provide abutting contact in all relative positions between the drive burr and the mounting head.

In FIGS. 4 and 5, a modified embodiment of the present invention is shown. In this embodiment, elongated drive burr 37 has serrations 38 formed at only one end thereof, which end is at a greater distance from drive shaft 39 than the corresponding end in the embodiment of FIGS. 2 and 3. It will therefore be appreciated that the movement of mounting head 40 a distance of one serration, will provide a smaller angular movement at the outer end of the wiper carried by the wiper arm than is possible with the embodiments of FIGS. 2 and 3, considering that the serrations in both embodiments are spaced the same minimum distance apart. Serrations 38 are adapted to be placed in interengaging relationship with serrations 41 on the relatively short side of elongated aperture 42 of mounting head 40. The relatively short end of elongated drive burr 37 has a conical surface 43 formed about the axis of drive shaft 39. Surface 43 is smooth and is adapted to be in abutting relationship with internal surface 44 of elongated aperture 42 in all positions of the mounting head relative to the drive shaft. The interengaging action between serrations 38 and 41 locates mounting head 40 relative to drive burr 37 and the abutting relationship between surfaces 43 and 44 provides stability of mounting head 40 on drive burr 37. It will be noted that serrations 41 and 38 are inclined relative to the longitudinal axis of drive shaft 39 so that the biasing of a wiper carried by the wiper arm against the windshield by the action of spring 45 causes wiper carrying portion 45' to exert a reactive force on the mounting head 40 through pin 46' to thereby tend to pivot mounting head 40 in a counterclockwise direction and provide a binding action between serrations 37 and 38 and between surfaces 43 and 44, thereby preventing accidental removal of mounting head 40 from drive burr 37, as described above relative to FIGS. 2 and 3. Aside from the above-described mounting structure, the other parts of the wiper arm depicted in FIGS. 4 and 5 are the same as described above relative to FIGS. 2 and 3.

In FIGS. 6–8, another embodiment of the present invention is shown. Drive shaft 46 has a drive burr 47 fixedly mounted thereon, drive burr 47 having a serrated portion 48 and a smooth circular portion 49. Drive burr 47 fits within aperture 50 of elongated drive burr 51 mounted within elongated aperture 52 in mounting head 53. A spring 54 has one end 55 fixedly secured within elongated drive burr 51 and the other end 56 formed into a latching member which engages the underside 57 of drive burr 47 when elongated drive burr 51 is in assembled relationship on drive burr 47. A pin 58 is fixedly secured to mounting head 53, the inner end 59 of pin 58 extending within enlarged recess 60 formed in the end of elongated drive burr 51. Pin 58 and recess 60 prevent elongated drive burr 51 from moving out of assembled relationship with aperture 52 of mounting head 53. Outer portions 63 of elongated drive burr 51 are arcuate and formed of a radius about the axis of drive shaft 46 so that the diameter between portions 63 is equal to the distance between walls 64 of mounting head 53. Furthermore, surfaces 65 and 66 are formed of a radius which is equal to the distance between the axis of drive shaft 46 and the inside surface 67 of the end wall 68 of mounting head 53. Arcuate surfaces 63, 65, and 66 provide abutting relationship with corresponding portions of elongated aperture 52 to thereby provide a stabilized mounting of mounting head 53 relative to elongated drive burr 51 when the wiper arm is in its mounted position with serrations 61 and 62 in engagement. It will be noted that because of the foregoing geometry, the bearing relationship between the portions 63, 65, and 66 and the inside of elongated aperture 52 is effective in all positions of mounting head 53 on elongated drive burr 51. It is to be noted that the serrations 61 of the elongated drive burr 51 and serrations 62 on the relatively short side of elongated aperture 52 are inclined relative to the axis of shaft 46, as shown in the drawings, for the purpose of providing a binding action which holds the serrations assembled, as described above relative to FIGS. 2 and 3.

Aperture 60 of elongated drive burr 51 is much larger than the end 59 of pin 58 to permit the longitudinal axis of elongated aperture 52 to be varied relative to the longitudinal axis of elongated drive burr 51 without in any way limiting the desired adjustment. In other words, as noted above, pin 58 and aperture 60 merely prevent separation of elongated drive burr 51 from elongated aperture 52 when the wiper arm is not mounted on a drive shaft.

When the wiper arm is mounted on shaft 46, spring 70 will cause a wiper carried by wiper carrying portion 69 to exert a force on the windshield, and an upward reactive force will be exerted on pin 77 by wiper carrying portion 69. This upward reactive force is transmitted to mounting head 53, to thereby cause serrations 61 and 62 to remain in interlocked engagement in the same manner noted above with respect to FIGS. 2-5. In the event is desired to change the orientation of mounting head 53 relative to elongated drive burr 51, it is merely necessary to apply a force 71 (FIG. 8) to mounting head 53 in the location shown. This will cause mounting head 53 to pivot and slide about fulcrum 72 from the position shown in FIG. 7 to the position shown in FIG. 8, whereby serrations 61 will become disengaged from serrations 62. The limit of pivotal movement between mounting head 53 and elongated drive burr 51 is determined when internal surfaces 73 and 74 of elongated aperture 52 are engaged by elongated surfaces 75 and 76, respectively, of elongated drive burr 51. After the foregoing pivotal movement of mounting head 53 has been effected in the above-described manner to disengage serrations 61 and 62, mounting head 53 may be pivoted in a clockwise or counterclockwise direction from the position shown in FIG. 6 until the wiper arm is aligned in a new position. Thereafter, upon removing force 71 from mounting head 53, the reactive force exerted on pin 77 as a result of spring 70 biasing wiper carrying portion 69 toward the windshield will cause mounting head 53 to pivot in a counterclockwise direction from the position shown in FIG. 8 to the position shown in FIG. 7, whereupon serrations 61 and 62 will become reengaged to hold the wiper arm in its adjusted position. It will be noted that the foregoing pivotal movement between the mounting head 53 and elongated drive burr 51 is effected as wiper carrying portion 69 pivots about pin 77, which otherwise serves in the same capacity as pin 17 of FIGS. 2 and 3 to permit the wiper carrying portion to pivot toward and away from an associated curved windshield when the wiper arm is in operation. Spring 70 is associated with the wiper arm in the same manner as spring 28 of FIGS. 2 and 3, and a detailed description of its operation is therefore deemed unnecessary.

While preferred embodiments of the present invention have been disclosed, it will be readily appreciated that the present invention is not limited thereto, but may be otherwise embodied.

What is claimed is:

1. A windshield wiper arm mounting construction comprising a drive shaft, an elongated drive burr having a pair of relatively long sides and a pair of relatively short sides mounted on said drive shaft, said elongated drive burr having a first longitudinal axis, each of said pair of relatively short sides of said elongated drive burr having first serrations thereon, a wiper arm having a mounting head, an elongated aperture in said mounting head having a pair of relatively long sides and a pair of relatively short sides for receiving said elongated drive burr, said elongated aperture having a second longitudinal axis, said elongated aperture being of a larger size than said elongated drive burr to permit the relative positioning therebetween with said first and second longitudinal axes in various orientations, and each of said pair of relatively short sides of said elongated aperture having second serrations thereon, said first serrations being received in interlocking engagement with said second serrations in said various orientations to thereby permit said mounting head to be fixedly mounted in various positions on said drive burr.

2. A windshield wiper arm mounting construction as set forth in claim 1 including spring means for retaining said first and second serrations in said interlocking engagement.

3. A windshield wiper arm mounting construction as set forth in claim 2 wherein said first and second serrations are inclined to the axis of said drive shaft and wherein said wiper arm includes a wiper carrying portion, pivot means coupling said wiper carrying portion to said mounting head, and wherein said spring means comprises a spring having one end thereof secured to said wiper carrying portion and the other end thereof secured to said mounting head, said spring biasing a wiper carried by said wiper carrying portion into engagement with an associated windshield and causing said wiper carrying portion to exert a reactive force on said mounting head to thereby bias said second serrations into said interlocking engagement with said first serrations.

4. A windshield wiper arm mounting construction as set forth in claim 3, wherein said elongated drive burr is of a configuration to permit said first and second serrations to be disengaged without removing said elongated drive burr from said elongated aperture, said disengagement being effected by the exertion of a force on said mounting head toward an associated windshield, to thereby permit said mounting head to be reoriented to an adjusted position relative to said elongated drive burr, said spring causing said first and second serrations to reengage after said force is removed.

5. A windshield wiper arm mounting construction as set forth in claim 4 wherein said elongated drive burr has fulcrum means thereon and wherein said mounting head includes a surface which is adapted to pivot on said fulcrum means when said force is applied to said mounting head.

6. A windshield wiper arm comprising a mounting head and a wiper carrying portion, an elongated aperture having a relatively long side and a relatively short side in said mounting head, an elongated drive burr having a relatively long side and a relatively short side, means for movably retaining said elongated drive burr in said elongated aperture, said elongated aperture having a first longitudinal axis, said elongated drive burr having a second longitudinal axis, said elongated aperture being of a larger size than said elongated drive burr to permit the relative positioning therebetween with said first and second longitudinal axes in various orientations, first serrations on said relatively short side of said elongated drive burr, second serrations on said relatively short side of said elongated aperture for receiving said first serrations in interlocking engagement in said vaious orientations to thereby permit said mounting head to be fixedly mounted in various positions relative to said elongated drive burr, and spring means operatively coupling said wiper carrying portion and said mounting head for both biasing a wiper carried by said wiper carrying portion into engagement with an associated windshield and for causing said wiper carrying portion to transmit a reactive force produced by the action of said wiper on said windshield to said mounting head to thereby bias said first and second serrations into said interlocking engagement.

7. A windshield wiper arm as set forth in claim 6 including cooperating portions on certain sides of said elongated drive burr and said elongated aperture for providing abutting engagement therebetween in said various positions to thereby provide support for said elongated drive burr in said elongated aperture in addition to said interlocking engagement provided by said first and second serrations.

8. A windshield wiper arm as set forth in claim 7 wherein said first and second serrations are inclined relative to the axis of said associated drive shaft.

9. A windshield wiper arm as set forth in claim 8 wherein said elongated drive burr includes a fulcrum and said elongated aperture includes a surface adapted to pivot on said fulcrum to thereby permit pivotal movement of said mounting head relative to said elongated drive burr and to permit separation of said first and second serrations preliminary to rotating said mounting head to an adjusted position relative to said elongated drive burr without removing said mounting head from said elongated drive burr.

10. A windshield wiper arm as set forth in claim 9 wherein said pivotal movement of said mounting head relative to said elongated drive burr for separating said first and second serrations from interlocking engagement is effected against the bias of said spring means.

References Cited in the file of this patent
UNITED STATES PATENTS
2,528,678    Anderson _____ Nov. 7, 1950